June 22, 1937.　　　J. W. SPARKMAN　　　2,084,600
AUTOMOBILE DOOR CONSTRUCTION
Filed Sept. 14, 1936
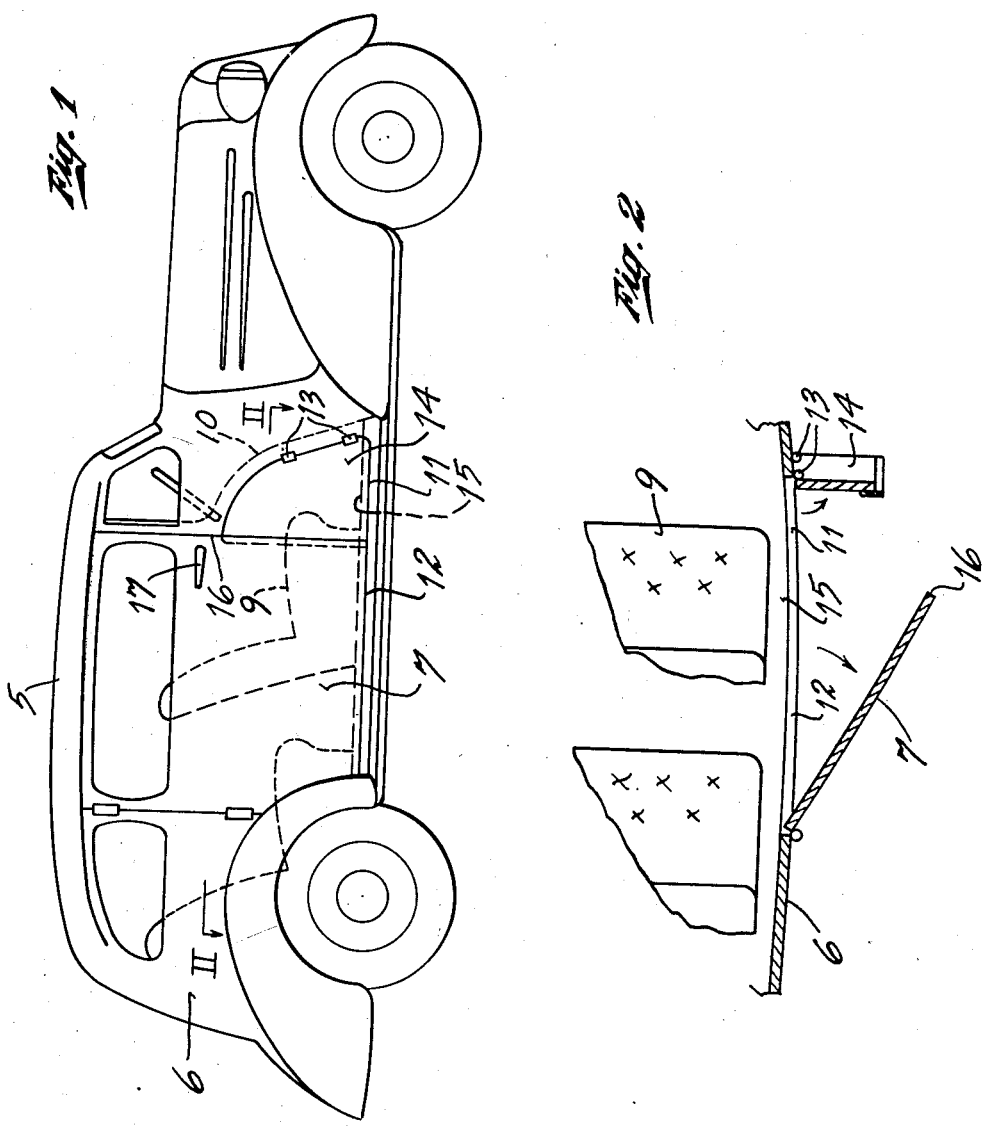
INVENTOR
J. W. Sparkman
BY
ATTORNEYS Patented June 22, 1937

2,084,600

UNITED STATES PATENT OFFICE 2,084,600

AUTOMOBILE DOOR CONSTRUCTION

John W. Sparkman, Birmingham, Ala.

Application September 14, 1936, Serial No. 100,653

4 Claims. (Cl. 296—44)

My invention relates to an improved door arrangement particularly adapted for automobile coach bodies which as now produced have a single door on each side, giving convenient access only to the front seat which, being divided, has its sections made movable to afford access to the rear seat.

The object of my invention is to perfect a new door arrangement whereby, without increasing the size and weight of the standard door on each side but by change in its position and the employment of a small supplemental door, direct access may be had to both front and rear seats in a coach type of automobile. To this end my invention contemplates the provision of a small door hinged along its forward edge to supplement the adjacent main door which is hinged along its rear edge, these two doors providing when open a door with a forward extension of its lower portion sufficient in size to provide leg room so that the partial access to the front seat afforded by opening the main door is increased and made ample by opening the supplemental door so that one may enter and leave the front seat as freely as the rear seat to which full access is afforded by the main door alone.

My invention further contemplates adapting the main door to close against the supplemental door and thus by its latch to hold both doors closed.

My invention further contemplates hinging the supplemental door at an incline so that it will gravitate to closed position and yet may be readily thrust by hand or knee to open position to facilitate access to or egress from the front seat.

My invention further contemplates providing an angled door frame member, extending along the forward edges of the main and supplemental door openings and adapted to afford ample load supporting strength to the roof of the car body at its forward end.

My invention further comprises the novel details of construction and arrangements of parts which, in their preferred embodiment only, are illustrated in the accompanying drawing, in which:—

Fig. 1 is a side elevation on a reduced scale of a typical automobile coach body showing the relative arrangement of its main and supplemental doors to the front and rear seats which appear in dotted lines.

Fig. 2 is a section taken on line II—II of Fig. 1, showing the doors in open position.

In the embodiment of my invention illustrated, I show a typical automobile body of the coach type, comprising a top 5, a side 6, and a main standard door 7 mounted in the body in a position to afford free access to the front seat 9. This door, of which one is provided on each side of the car body, is hinged along its rear edge so as to swing outwardly and rearwardly in opening. Instead of the customary door frame conforming to the door 7, the frame along its forward edge, commencing at a point above the level of the driver's knee seated on the front seat, is deflected forwardly and downwardly at 10 to provide a forward extension 11 of the lower portion of the main door opening 12. As shown, this frame portion 10 is struck on an arc overhead until it reaches the plane of the hinges 13 for a small supplemental door 14, which hinges are disposed in an upwardly and rearwardly inclined plane tangent at its upper edge with the curved portion of the supplemental door frame and extending to the threshold 15 of the combined door openings. This threshold preferably is level and continuous under both main and supplemental doors on the same side of the body. The supplemental door hinges could be arranged otherwise than as shown, but their inclined arrangement is preferable as it makes the supplemental door automatically self closing.

The rear edge of the supplemental door matches into and forms a vertical continuation of the forward upper edge 16 of the main door frame so that the main door is adapted to close against such rigid upper portion of its frame while its lower portion will close against the supplemental door as a movable lower frame portion. The main door is provided with any suitable type of latch or lock controlled by the handle 17 which engages a keeper on the rigid portion of its door frame above the supplemental door.

The main door 7 can be in all respects a standard door differing merely in its relative position to the front and rear seats, this position being such that while free access is afforded to the rear seat, only partial access is afforded to the front seat. The supplemental door can be small, light, relatively inexpensive, and so blended into the body design that it will have merely the appearance of a trim or finish so that it will in nowise detract from the lines, symmetry or beauty of the car body design.

Each bottom frame member or threshold 15 will afford a rigid bottom stop both for the main and supplemental doors and the supplemental door 14 will, in its closed and locked position, be adapted to brace the angled forward door frame and take its share of any emergency load imposed on the top of the body. It is desirable that the supplemental door be made of light construction so that after opening door 7, one may with a thrust of the knee open it and leave the car from the front seat. The upper edge of the supplemental door 14 will come high enough so that it can be readily grasped from the outside by one hand while opening the main door with the other hand, to afford convenient access to the front seat.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. An improved door arrangement for a vehicle body having front and rear seats, comprising a main door hinged at its rear edge and disposed to give free access to the rear seat and partial access only to the front seat, a supplemental door hinged at its forward edge opposite the lower portion of the first mentioned door and adapted when closed to abut said main door and when opened to enlarge the lower forward portion of the main door opening where needed to afford complete access to the front seat, and a common door frame providing an uninterrupted opening for the reception of said doors having its forward edge angled to follow the forward non-abutting edges of said doors.

2. A door arrangement for a two seated automobile body, comprising a door frame having a vertical rear edge carrying the main door hinges and a main standard door hinged thereto, said frame having its forward edge sharply inclined forwardly from a point above the knee level of the driver substantially to the floor level, and a supplemental door hinged to said inclined frame portion and having its rear edge, when in closed position, forming a continuation of a main door frame and adapted to be overlapped by the main door, and latch means for the main door coacting with said frame above the supplemental door.

3. In an automobile body of the coach type, comprising front and rear seats and having a single uninterrupted door opening on each side of the body arranged to afford free access to both seats, a door frame for said opening having its forward edge with its lower portion projected sharply forwardly commencing at a level immediately above the knee level of persons seated on the front seat, a main door of substantially standard size hinged to the rear edge of the door frame and serving to fully close only the upper portion of the door opening, a supplemental door adapted to complete the closure of said door opening and hinged to the forwardly projected portion of the front edge of the door frame, the rear edge when closed being overlapped by the forward edge of the main door when closed, and a latch means on the main door which interlocks with its frame above the supplemental door for latching both doors in closed position.

4. A door arrangement according to claim 3, in which a common continuous threshold is provided below both main and supplemental doors and is adapted to brace their lower edges against inward thrust.

JOHN W. SPARKMAN.